(12) United States Patent
Seel et al.

(10) Patent No.: US 6,347,825 B2
(45) Date of Patent: Feb. 19, 2002

(54) SIDE WINDOW BLIND WITH SLOT COVERING

(75) Inventors: Holger Seel, Aidlingen; Herbert Walter, Ebersbach, both of (DE)

(73) Assignee: BOS GmbH & Co. KG (DE)

( * ) Notice: Subject to any disclaimer, the term of this patent is extended or adjusted under 35 U.S.C. 154(b) by 0 days.

(21) Appl. No.: 09/839,347

(22) Filed: Apr. 20, 2001

(30) Foreign Application Priority Data

Apr. 25, 2000 (DE) .......................................... 100 20 212

(51) Int. Cl.[7] .................................................. B60J 1/20
(52) U.S. Cl. ..................... 296/97.8; 296/97.4; 296/152; 160/370.22
(58) Field of Search ............................... 296/97.4, 97.8, 296/152; 160/370.22

(56) References Cited

U.S. PATENT DOCUMENTS 5,089,912 A * 2/1992 Simin ..................... 296/97.4 X
5,605,370 A * 2/1997 Ruiz ....................... 296/97.8 X

* cited by examiner

*Primary Examiner*—Joseph D. Pape
(74) *Attorney, Agent, or Firm*—Leydig, Voit & Mayer, Ltd.

(57) ABSTRACT

A side window blind is integrated in the bodywork of a motor vehicle. The blind can be retracted into the hollow space between the inner lining and the outer skin of the vehicle. The blind passes out through a slot in the window embrasure. In order to close this slot when the side window blind is not in use, a flexible cover strip is connected with the reinforcing strip on the front edge of the blind material, which in the driven-out state comes to lie against the contour of the reinforcing strip. In the driven-in or drawn in state, the cover strip is lifted off sectionwise from the reinforcing strip and lies, closely to the slot, on at least one of the slot edges.

26 Claims, 6 Drawing Sheets

SIDE WINDOW BLIND WITH SLOT COVERING

FIELD OF THE INVENTION

The invention generally relates to blinds for use in motor vehicles.

BACKGROUND OF THE INVENTION

From DE 100 005 970, which is not prior-published, a side window for motor vehicles is known. A winding shaft on which an edge of a roller blind material is fastened is rotatably supported between the body work outer skin and the inner lining. The roller blind can be drawn out through a slot in the window. In the drawn-out state or position, the blind material is nearly congruent with the window.

An electric motor with the aid of pulling or pushing members which engage on the front edge of the blind material actuates the roller blind. The front edge of the roller blind material refers to the edge which, when looked at from the curvature corresponding to the window form, extends essentially parallel to the winding shaft.

Because of the arrangement of the actuating members for the roller blind, which in the rolling out of the blind material come out of the respective slot in the window embrasure, the slot must be relatively wide.

Even if the slot only has a width corresponding to the width a reinforcing strip on the front edge of the blind material, the slot remains open over a broad range when the roller blind is pulled or rolled in. Because of the curvature of the front edge of the blind material which is fitted to the corresponding edge of the window, a substantial part of the front edge of the blind material disappears under the slot edge, while only a small range is filled out by the front edge and the reinforcing strip.

The open slot is not only unsightly, but it also involves certain hazards with regard to potential injuries to children should they stick their fingers into the open slot. Furthermore, relatively large objects can fall into the hollow space of the body work between the outer metal plate and the inner lining.

OBJECTS AND SUMMARY OF THE INVENTION

Accordingly, in view of the foregoing, an object of the invention is to provide a motor vehicle having a slot through which a side window blind can be deployed that is at least substantially closed.

With the side window blind of the present invention, a slot in the window frame is provided in a known manner, over which a connection to a hollow space in the vehicle body work is present. A blind material is stored in the hollow space when not in use. The blind material is provided with a front edge, the contour of which corresponds to the contour which the window frame has in the area that lies opposite the slot.

In order to substantially close the slot when not in use, a covering strip is arranged on the front edge of the blind material. With the blind rolled out, the covering strip follows the course of the front edge, i.e. attaches itself to this front edge, while with the blind rolled in, the covering strip is lifted off section-wise from the front edge in order to substantially close the slot.

During movement of the blind material into the hollow space, the covering strip is correspondingly lifted off from the front edge in order to close the slot.

The window frame in which the slot is located can be located at the lower end of the side window pane. This arrangement is preferred when the window is the window of a side door. Another possibility is to accommodate the slot in a window frame running about vertically, for example in a B-column, an arrangement which can be used advantageously in two-door vehicles when the B-column runs straight in the window area.

The slot through which the blind material moves when it is moved or rolled in and out can be combined with the slot through which the pane also runs, if it is a lowerable pane.

A mechanism is provided in order to fix the covering strip reliably on the front edge in the deployed or rolled-out position. This mechanism can be formed by the cover strip itself or by another mechanism on the cover strip or on the front edge. If the mechanism is formed by the cover strip itself, it can comprise a strongly spring-burdened cover strip which, by reason of its own curvature, tends to follow the contour of the front edge of the blind material. During the retraction of the blind material, the cover strip is necessarily converted into a more or less stretched form.

Another possibility for holding the cover strip fast on the front edge lies in using a pulling mechanism in order to draw the cover strip onto the front edge. Such a mechanism can be useful especially if the cover strip consists of a relatively soft plastic material which provides only a slight recoil force. The pulling mechanism can comprise at least one pulling member which engages on at least one end of the cover strip. The pulling mechanism itself can be elastically stretchable or, if it is elastically unstretchable, acted upon with a draw spring.

The shape of the front edge governs the number of pull members that is necessary. If the highest point of the blind material arises beside one side, the cover strip is rigidly joined with the front edge in this point. Only its other end is movable and must be drawn by the pull member onto the front edge. If the highest point of the front edge lies remote from the two side edges, the cover strip is fastened to the cover to the cover strip occurs at this point. It is then necessary to draw both ends of the cover strip onto the front edge with, in each case their own pull mechanism.

The securing of the cover strip on the front edge of the blind material can also occur without elastic members, for example with the aid of magnets. These magnets can be individual magnets separated from one another, or the cover strip can be made entirely from a plastic that is filled with ferromagnetic material, similar to the sealing strips of refrigerators. This arrangement has the advantage that the cover strip is automatically held firmly to the front edge of the blind material, when this consists of a corresponding ferromagnetic material. With the blind drawn in, the cover strip is held firmly on the window strip, for which purpose the latter likewise preferably consists of ferromagnetic material.

The length of the cover strip is governed according to the importance of the slot length which, with a retracted blind, is not filled out by the reinforcing strip on the front edge of the blind material because of the curvature of that front edge.

Aside from the fact that a part of the slot could also be filled out by the front edge of the blind material, it is preferable, for visual reasons, if the cover strip nevertheless has a length such that the slot is covered over its entire length.

In order to achieve the desired automatic lifting-off of the cover strip from the blind material, the cover strip is at least wider than the slot. The arrangement can be made in such manner that the cover strip overhangs one of the slot edges over its entire length. This arrangement is preferable if the same slot is used for the lowerable side pane and the blind material.

It is possible, however, to let the cover strip cover both slot edges. This is preferable in the case of rigid-side panes or, when there is space enough for the lowerable side pane and the side window roller blind to have two separate slots which run adjacent to one another.

If the blind material consists of a material that also can be wound with a small radius, a winding shaft on which the blind material is wound can be mounted in the hollow space. Instead of directly winding the blind material itself, the blind material can be provided on its rear edge with bands or cords which are wound onto narrow band or cord disks. The blind material itself in this case remains stretched. Such an arrangement is advantageous in the case of rigid side panes when the slot does not run straight with respect to the longitudinal direction of the vehicle.

For the actuation of the blind material, i.e. for retracting the blind, a spring arrangement is provided, with the aid of which the blind material can be retracted into the hollow space. Such an arrangement is preferable when a manually operable side window blind is provided which is driven or drawn out by the grasping of a hand grip on the front edge or of the cover strip.

In the case of the remote-controllable side window roller blind, the combination of a spring drive and an electric-motor drive is preferable. With the aid of the spring drive, the blind material is held taut, while the electric-motor drive prescribes the desired position of the blind material. With this arrangement the same results are achieved, regardless of whether the spring drive cooperates with the rear edge or the under edge of the blind material while the electric-motor drive acts on its front edge, or, if kinematically reversed, the electric motor acts on the rear edge of the blind material, which remains constantly in the hollow space.

The deployment or drawing out of the blind material can occur by thrust members, or with the aid of a gallows-like construction such as is shown in DE 100 005 970.

These and other features and advantages of the present invention will be more readily apparent upon reading the following description of exemplary embodiments of the invention and upon reference to the drawings wherein:

While the present invention will be described and disclosed in connection with certain embodiments and procedures, it is not intended to limit the invention to those embodiments. Rather it is intended to cover all such alternative embodiments and modifications as fall within the spirit and scope of the invention.

DETAILED DESCRIPTION OF EMBODIMENTS

In the following description, terms such as "front", "rear", "above" or "below" as well as concepts with similar semantic content, inclusive of the terms "right" and "left" are used with respect to the figures in the manner in which they are usually used for the direction designation on a motor vehicle. Only in reference to the blind are the terms front edge or rear edge used in reference to the blind itself, independently from the installation position in the vehicle.

Figure 1:
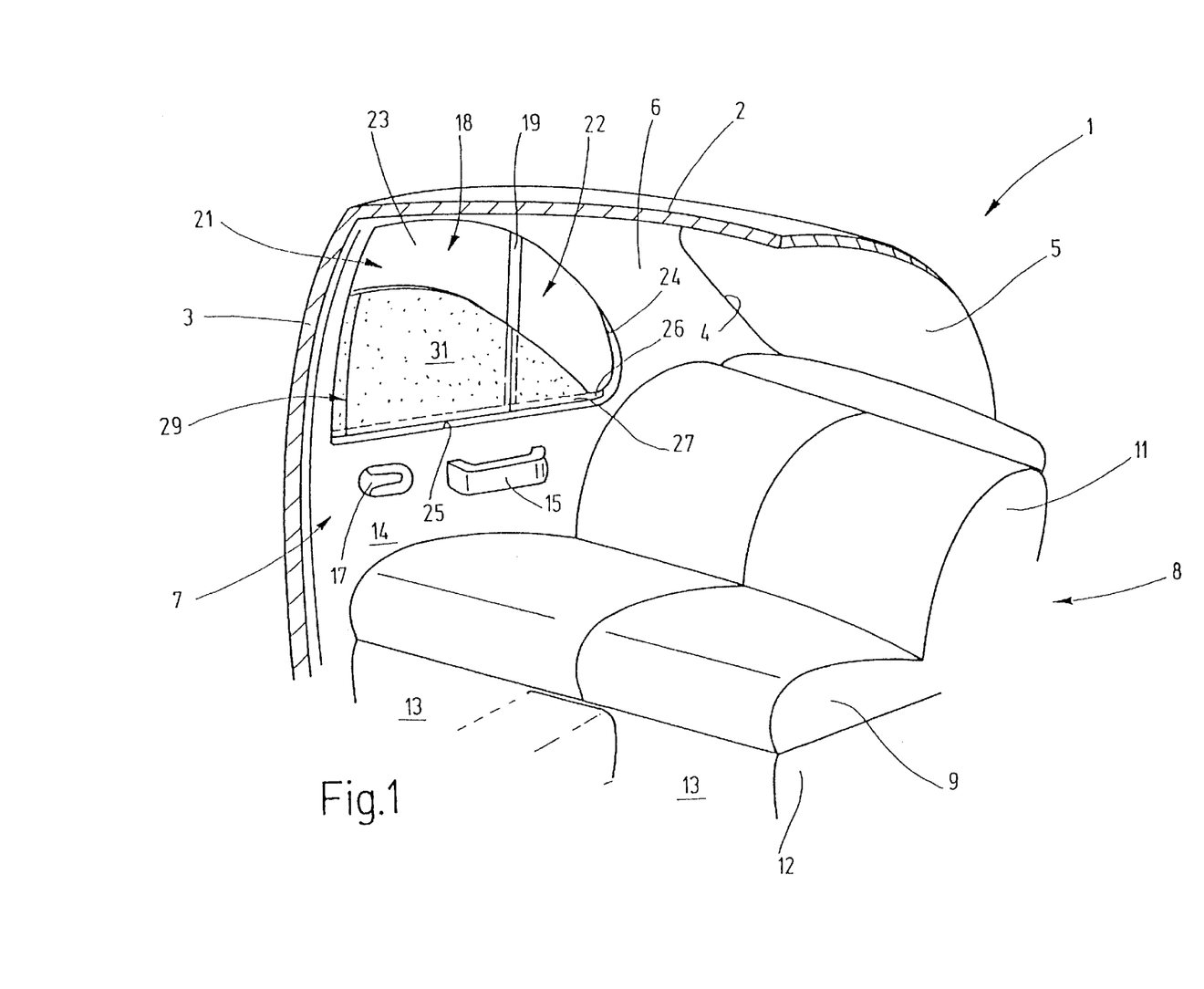
FIG. 1 is a partially cut-away perspective view of a rear side door of an illustrative vehicle in accordance with the invention.

FIG. 1 shows the broken-open, trimmed-off rear portion of a passenger car. The figure illustrates a view of the right interior side, which is in mirror image to the left interior side. The representation is simplified; thus, for example, bodywork interior structures such as reinforcements and fastening means are not shown, since their depiction is not required for an understanding of the invention.

The illustrated bodywork section 1 has a roof 2, from which a B-column 3 laterally leads downward to a floor group (not shown). A corresponding B-column would be provided on the broken-off side of the vehicle. The roof 2 goes over at its rear edge into a rear window opening 4 on a C-column 6 which is located at a distance from the B-column 3. Between the B-column 3 and the C-column 6, in a known manner, a rear, right side door 7 is hinged onto the B-column 3.

At the height of the rear, right side door 7 there is located a rear seat 8, which includes a seating surface 9 and also a rear seat back 11. The rear seating surface 9 lies on a support surface 12, which belongs to the floor group and in which foot spaces 13 are formed in front of the rear seating surface 9.

The side of the side door 7 facing the interior space is provided with an inner lining 14, to which a door handle 15 is fastened and in which an actuating latch 17 is admitted in order to open the lock of the side door 7.

Above its inner lining 14, the side door 7 has a window opening 18 which is divided by a cross-piece 19 into two sections 21 and 22. The section 22 has an approximately triangular shape, while the section 21 is, in the broadest sense, rectangular. A side window pane 23 is present in the section 21 which is lowerable in a known manner. The two sections 21, 22 are separated from one another by the cross-piece 19 which serves as a window pane guide.

The two sections 21, 22 are surrounded on the outside by a continuous common window jamb or embrasure 24. The window embrasure has at its lower edge a substantially straight section 25, which is somewhat wider than the rest of the window embrasure 24. In the window embrasure section 25, a slot 26 is present which extends over the entire length of this window embrasure section 25. The slot 26 is bounded to the car interior by a slot edge 27. Its outer boundary is the window pane 23 as well as the pane in the window section 22.

Figure 2:
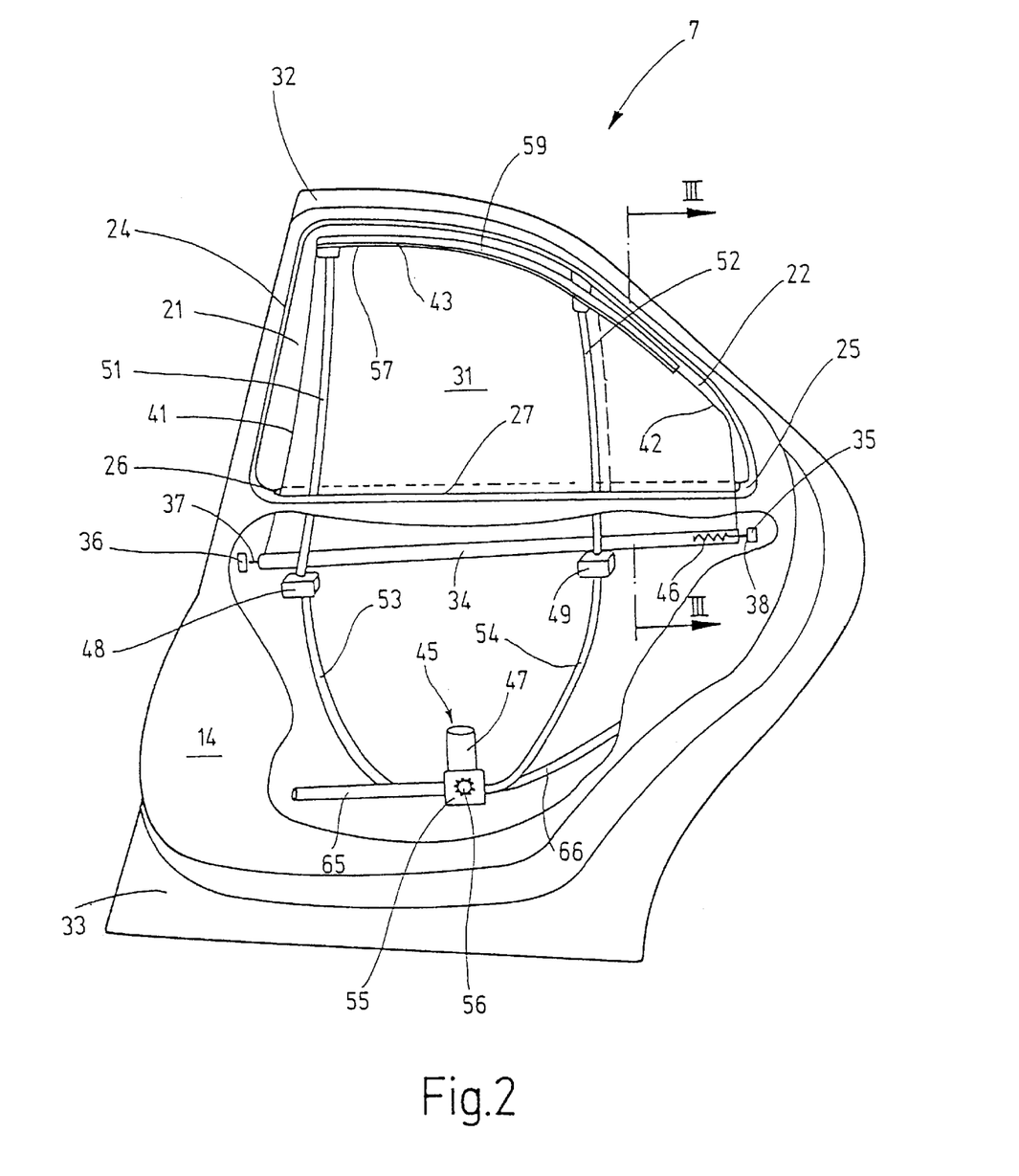
FIG. 2 is a schematic partially cut-away perspective view of the rear side door of FIG. 1.

The side door 7 is provided with a side window blind 29 represented in detail in FIG. 2, the blind material 31 of which is partially drawn out in FIGS. 1 and 2, in order to protect the rear portion of the vehicle against solar radiations. The blind material 31 extends through the slot 26 present beside and underneath the window frame sections 21, 22. In the illustrated embodiment, the bodywork of the vehicle forms the housing of the side window blind 29.

In FIG. 2, the side door 7 is separately illustrated. In FIG. 2, there can be seen a surrounding door rabbet 32, sections of the door outer skin 33 consisting of sheet metal, as well as the inner liner which is present on the inner skin of the door 7.

The side window blind 29 includes a winding shaft 34 which is supported underneath the window embrasure section 25, behind the inner lining 14 on the door 7. For this the door carries, spaced from one another, two bearing blocks 35, 36, which receive bearing pins 37, 38 that project axially from the tubular winding shaft 34.

The blind material 31 consists of a cut-out from a plastic foil which sufficiently shields out the sunlight. The outer contour corresponds to the outer contour of the window opening 19, i.e. to the sum of the two window openings 21 and 22.

The blind material 31 is bounded by a lateral straight edge 41, by a rear contoured edge 42, as well as by a front or upper edge 43.

In order to move or draw the blind material 31 in or out, a drive arrangement 45 is provided. The drive arrangement includes a schematically shown spring motor 46 which is present in the winding shaft 34. The spring motor 46 is solidly connected to the winding shaft 34 by one of its ends. Its other end is torsionally coupled to the bearing pin 38. The bearing pin 38 in turn is rigidly supported in the bearing block 35. The spring motor 46 generates a pre-tensioning force on the winding shaft 34, in the direction of drawing in of the blind material 31. To this end, the blind material 31 is fastened in a known manner to the winding shaft 34, for example by means of a weather-strip.

A further component of the drive arrangement 45 is a gear motor 47 which, as described in the following, is coupled via gears with the front edge 43.

Two slide guide blocks 48, 49 are fastened to the door 7 spaced from one another underneath the winding shaft 34. A pressure-resistant and relatively bending-resistant cylindrical actuating member 51, 52 emerges in an upward direction from each of the slide guide blocks 48, 49. The upper free end of the actuating members 51, 52 is firmly joined with the front edge 43.

Proceeding from the guide blocks 48, 49, wrappings 53, 54 in the form of hoses lead to the gear motor 47. The wrappings serve for the pressure-resistant guidance of the actuating members 51, 52 sliding in them.

Each actuating member 51, 52 is formed by a pressure-resistant, linear element, for example a flexible metal or plastic wire, the core of a Bowden cable or of a thrust-resistant, cabled wire strand. At least on the motor-side end, each actuating member 51, 52 carries a wire winding forming a gearing on its outer circumferential surface, which is rigidly joined with the actuating member 51, 52. Actuating members of this type are also available under the trade name "SU-flexwelle" and are used, inter alia, in window lifters.

The drive motor 47 is a permanently energized direct current motor, on the outlet side of which a reducing gear 55 is arranged. A face gear wheel 56 is rigidly seated on an output shaft of the gear 55. The division of the face gear wheel 56 agrees with the division of the worm or screw on the actuating members 51, 52. The actuating members 51, 52 run tangentially past oppositely lying sides on the gear wheel 56, its outer gearing meshing with the gear wheel 56.

In this manner, the drive motor 47 is operatively connected with the front edge 43 of the blind material 31.

Figure 3:
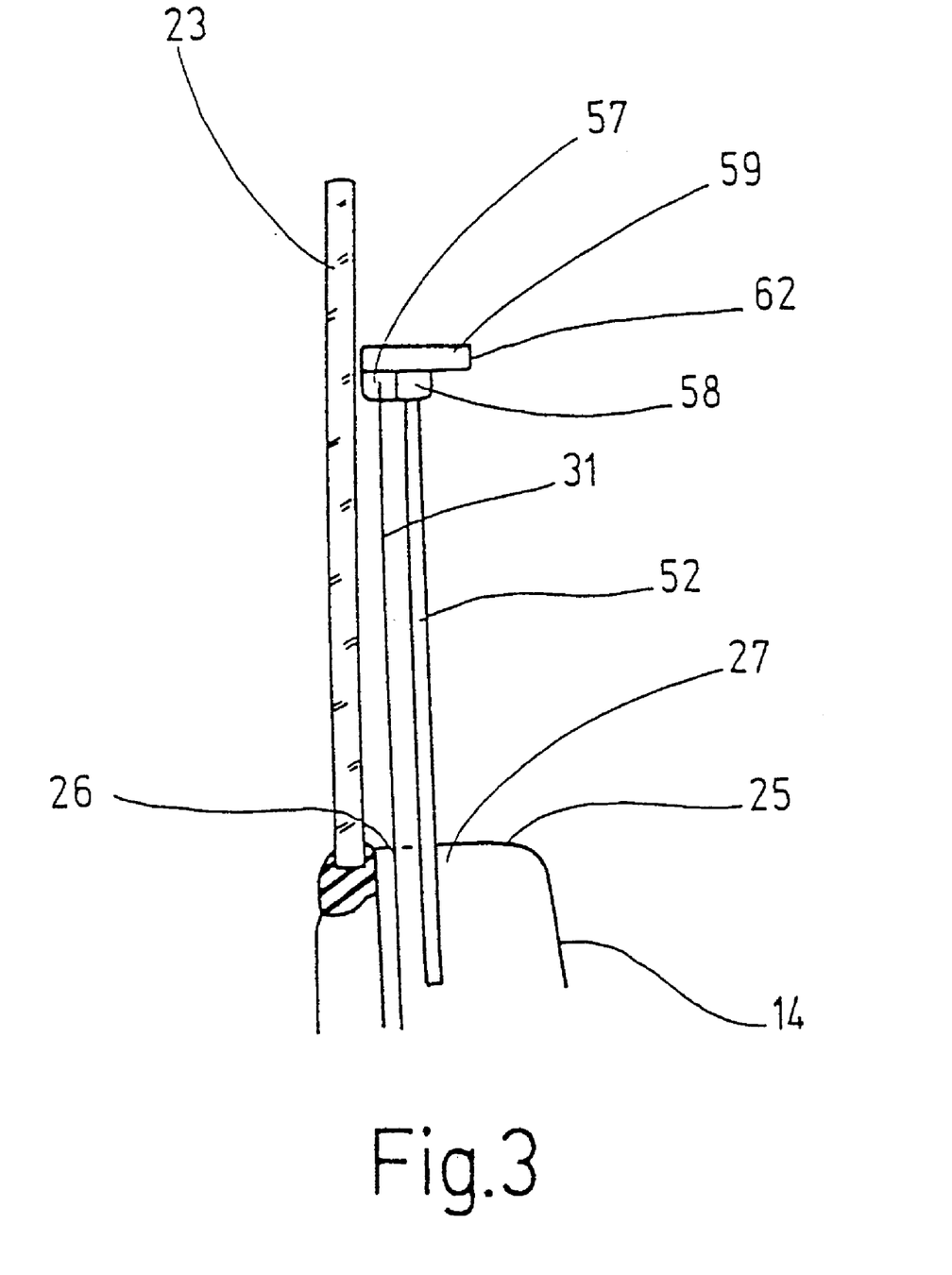
FIG. 3 is an enlarged section view taken along line III—III of FIG. 2 showing the front edge of the blind material connected with the cover strip.

As shown in FIG. 3, the front edge of the blind material 31 is provided with a reinforcing strip 57 which extends over nearly the entire length of the front edge between the side edge 41 and the side edge 42.

The reinforcing strip 57 is provided in the area of the two actuating members 51, 52 with receiving pockets 58, in which the free ends of the actuating members 51, 52 are plugged.

On the upper side of the reinforcing strip 57, a covering strip 59 is seated, the length of which corresponds to the length of the slot 26. It is, according to FIG. 4, firmly and securely joined with the reinforcing strip 57 in the vicinity of the side edge 41 at 61. The covering strip 59 consists, for example, of a profile rectangular in cross section with increased resilient recoil force. It is bent in such manner that in the relaxed state it has over its entire length a curvature which is somewhat less than the least curvature in the area of the front edge 43 or of the reinforcing strip 57.

The width of the cover strip 59 is such that, on the one hand, it bears on the inner side of the window pane 23 or of the guide rail 19, and, on the other hand, as described in the following, it can cover the slot edge, with its edge 62 lying away from the window pane 23. The cover strip 59 is thus wider than the slot 26 that is formed in the lower window embrasure section 25.

Figure 4:
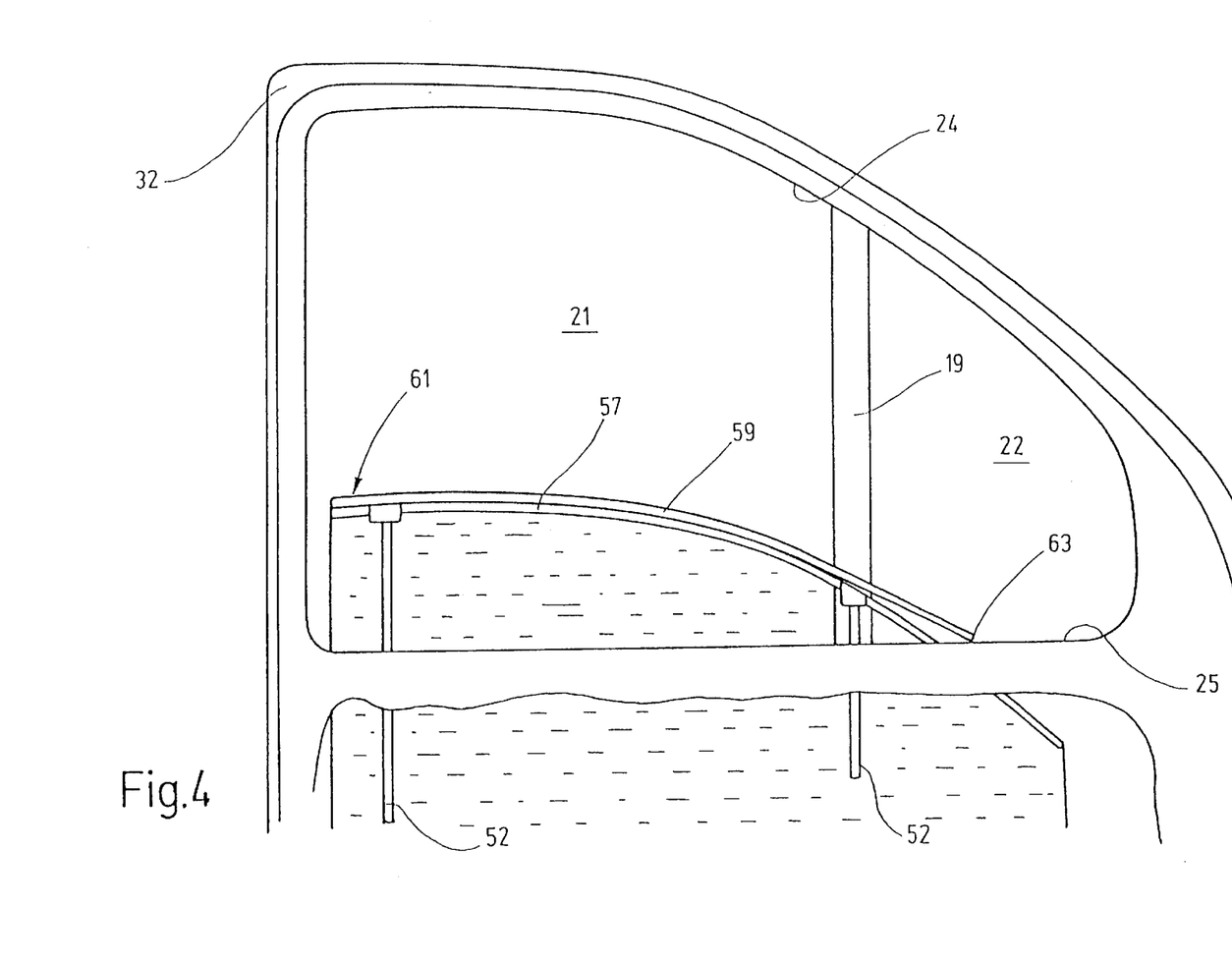
FIG. 4 is an elevation view of the upper portion of the door of FIG. 2 with the blind partially drawn-out blind.

Since the cover strip 59 is firmly joined with the reinforcing strip 57 at 61, as shown in FIG. 4, it bears over its entire length on the upper side of the reinforcing strip 57 facing away from the blind material. Between the under side of the cover strip 59 and the upper side of the reinforcing strip 57 no gap is present.

However, its other end, which lies away from the fastening point 61, can at any time be resiliently lifted from the upper side of the reinforcing strip 57. By reason of the type of connection between the cover strip 59 and the reinforcing strip 57, the cover strip and the reinforcing strip cannot be twisted against one another.

The side window blind 29 thus far described functions as follows, the extended position according to FIG. 2 being taken as starting point:

The two actuating members 51, 52 have been run out with the aid of the drive motor 47 and they have moved the front edge 43, with the reinforcing strip 57, into the vicinity of the upper section of the window embrasure 24. A small gap now remains between the front edge of the side window roller blind 26 and the upper section of the window embrasure 24. The window opening 18 is nearly completely covered with the blind material cutout 31.

Since no outside force acts on the cover strip 59, the latter closely bears onto the upper surface of the reinforcing strip 57, as already explained.

The blind material 31 is held taut with the aid of the spring motor 46, which tends to wind the blind material 31 onto the winding shaft 34. In this, it is hindered by the actuating members 51, 52 which are blocked at their lower ends by the drive motor 57, so that they cannot be pushed back under the action of the spring motor 46.

When the user wishes to draw in the side window blind 29, he sets the drive motor 47 into operation in the corresponding turning direction, which thereupon draws the actuating members 51, 52 downward and moves the ends overhanging the gear 55 back into protective or storage tubes 65, 66.

To the extent in which the actuating members 51, 52 disappear in the downward direction, through the slot 26, the front edge 43 of the blind material 31 moves likewise downward. After the front-edge has moved a certain distance, the downward leading, lower-lying end 63 of the cover strip 59 will strike beside the slot edge 27 on window embrasure section 25, as shown in FIG. 4. An outside force now acts on the cover strip 59, which tends to lift the cover strip 59 off from the reinforcing strip 57. Since the recoil force in the cover strip 59 is, certainly, relatively high in order to ensure the contacting path, but is less than the winding force exerted by the spring motor 46, the blind material 31 is further drawn in. The cover strip 59 is increasingly lifted off from the reinforcing strip 57 and transferred into an essentially stretched position.

Figure 5:
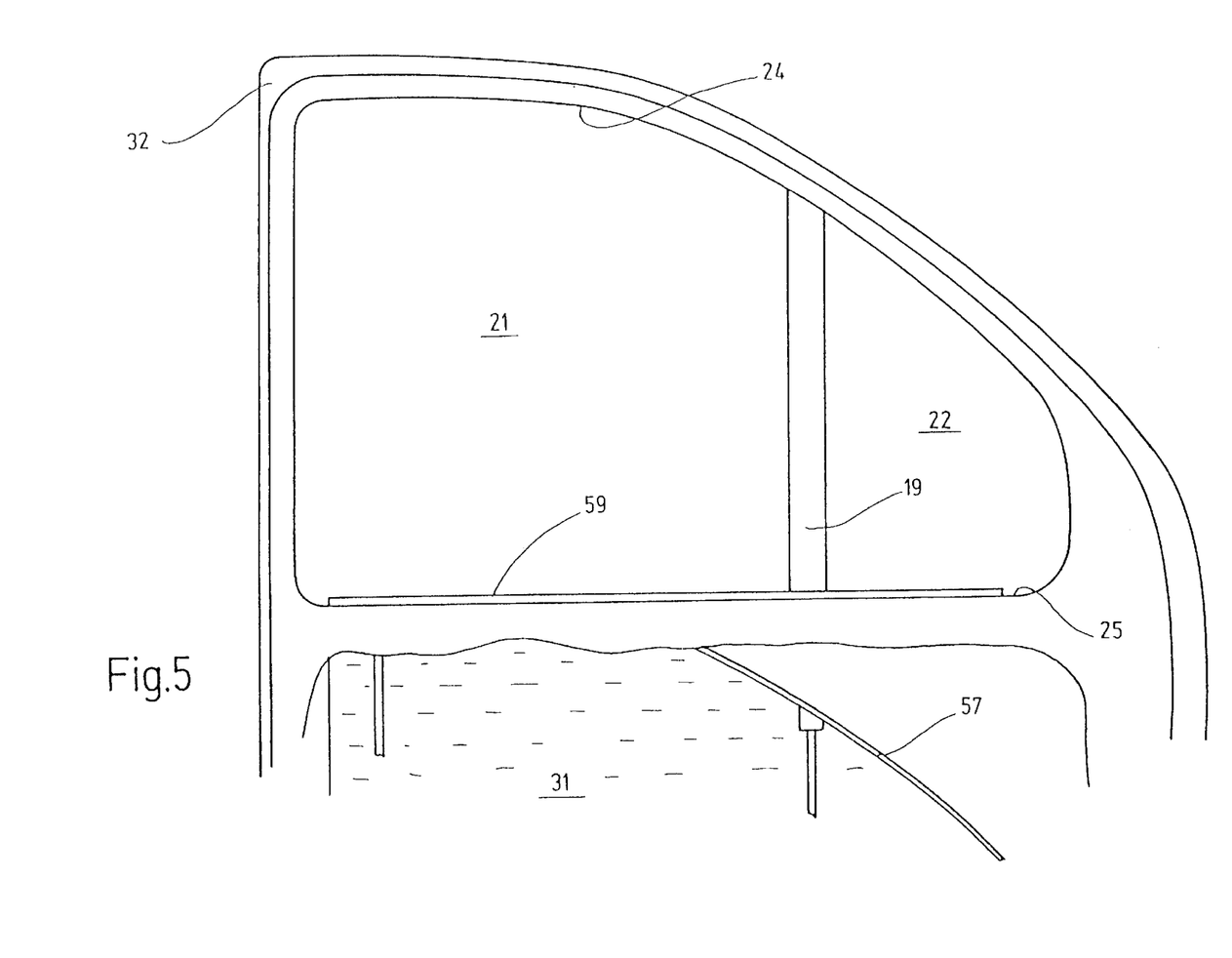
FIG. 5 is an elevation view of the upper portion of the door of FIG. 2 with a retracted or drawn-in blind.

When the side window roller blind 29 is finally completely retracted as shown in FIG. 5, the reinforcing strip 57 is arranged substantially underneath the slot 26 in the inner or hollow space of the door 7, while the cover strip 59 rests beside the slot edge 27 on the window embrasure section 25 and covers the slot 26.

The lower end of the motion is reached when the end section 61, joined rigidly and immovably with the reinforcing strip 57, comes to lie on the upper side of the window embrasure section 25 and blocks any further downward movement.

In the drawing out of the side window blind 29, the reverse movement occurs. The reinforcing strip 57 is raised with the aid of the actuating members 51 and 52, moving upward through the slot 26. To the extent in which the reinforcing strip 57 is lifted, it is made possible for the cover strip 59 again to come to bear on the upper side of the reinforcing strip 57. In the upward stroke, it is progressively lifted off from the window embrasure section 25 until finally the position according to FIG. 2 is again reached.

Instead of using a cover strip 59 that has a relatively high recoil force, a cover strip can also be used having a recoil force which is relatively slight. In such a case, a plastic strip is used, which is filled with magnetized particles and which, with the aid of the magnetic force, holds fast to the reinforcing strip 57, which is likewise filled with ferromagnetic particles.

Instead of accommodating the magnetized particles in the cover strip 59, these particles can also be integrated into the reinforcing strip 57, while the cover strip 59 contains only unmagnetized ferromagnetic particles.

Depending on the window geometry or the winding relations, the cover strip 59 can also be joined firmly with the reinforcing strip 57 in the middle area. Then both ends of the cover strip have to be raised when the blind 21 is driven in.

Such an arrangement is also possible in the embodiment in FIGS. 4 and 5, if care is taken that the wound blind material 31 on the winding shaft 34 has a truncated conical form. The forward-pointing side edge 41 then would be wound up somewhat more rapidly than the rear side edge 42. The highest point of the cover strip 57 in the reeled-in state would no longer be its left end, but a point somewhere in the vicinity of its middle. At this point, the cover strip 59 would have to be joined rigidly with the reinforcing strip 57.

Figure 6:
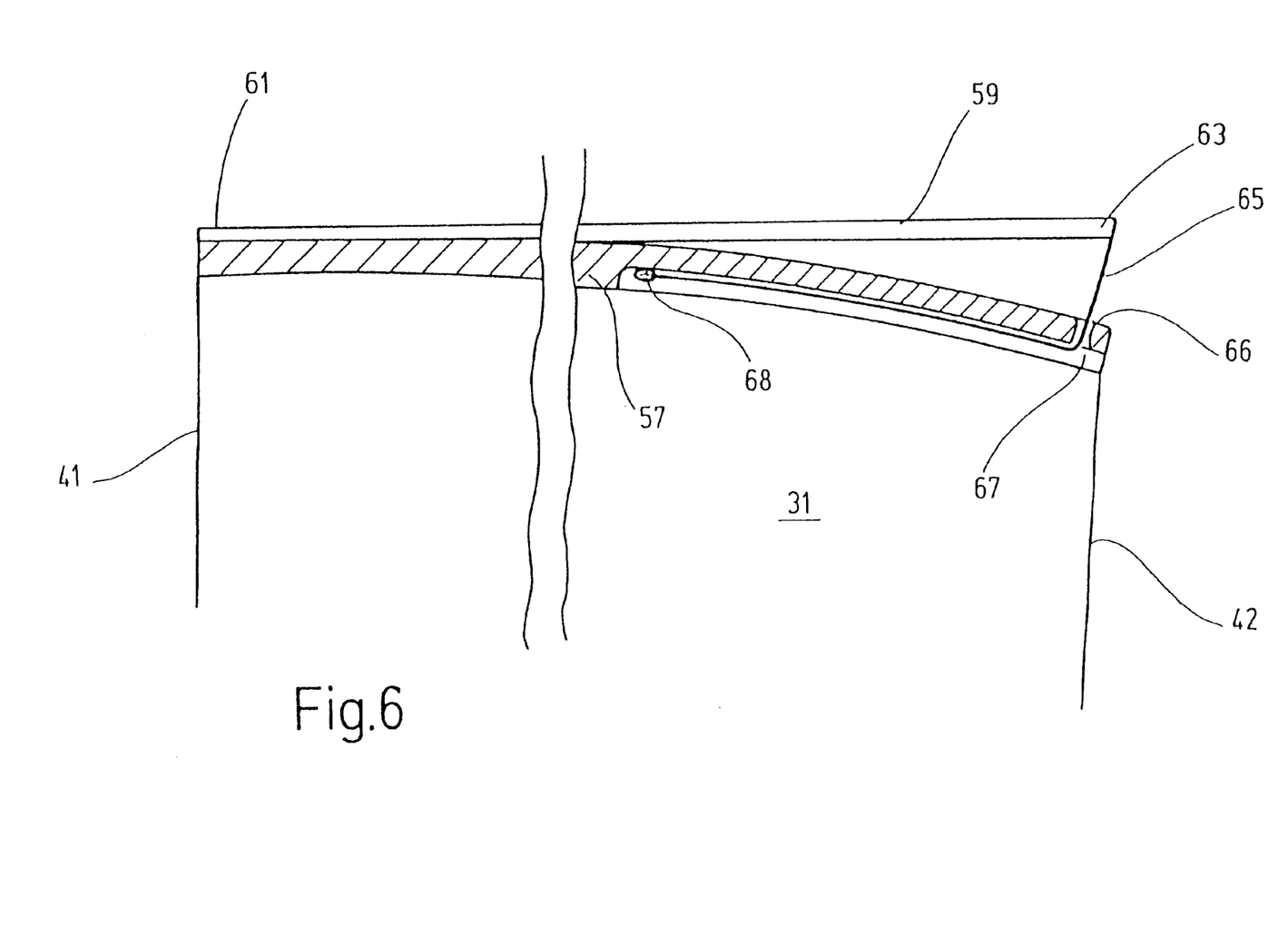
FIG. 6 is a partially cut-away side view of the front edge of the side window roller blind of FIG. 2, as well as the associated cover strip, which is drawn onto the front edge with the aid of a pulling or tension mechanism.

Instead of holding the cover strip 59 on the upper side of the reinforcing strip 57 solely by its own tension, an embodiment in which the cover strip is held in place with the aid of tension members 65 is also possible, as shown in FIG. 6. Specifically, with the blind material 31 drawn out, the respective end 63 of the cover strip 59 rests on the reinforcing strip 57 and the reinforcing strip 57 contains an opening 66 leading to its under side. The opening 66 leads from the upper side of the reinforcing strip 57 into a groove 67 which is provided on the under side of the reinforcing strip beside the blind material 31. The groove 67 extends in the lengthwise direction of the reinforcing strip 57. It serves to accommodate the per se elastic tension member 65. One end of the elastic tension member 65 is connected with the end 63 of the cover strip 59, while its other end terminates in a loop at 68, which is suspended in a corresponding hook in the groove 67.

With the aid of the per se elastic tension member 65, comprising for example a covered rubber cord, the end 63 is drawn through, onto the upper side of the reinforcing strip 57.

With the drawing in of the blind material through the upper side of the window embrasure section, the cover strip 59, as described earlier, is drawn against the action of the tension member 65, away from the upper side of the reinforcing strip 57.

In the drawn in position in all the shown variants, a force arises which holds the cover strip 59 firmly on the upper side of the window embrasure section 25 so that the slot 26 is closed.

The length of the cover strip 59 is expediently such that it overhangs in both directions the longitudinal ends of the slot 26. This means that in the area of the left side edge 51 the cover strip 59 does not end with the reinforcing strip 57, but projects beyond this by a corresponding amount, as shown in the figure.

A side window blind 29 is integrated in the bodywork of a motor vehicle. The blind material 31 can be retracted into the hollow space between the inner lining 14 and the outer skin of the vehicle. The blind material 31 passes out through a slot 26 in the window embrasure 24. In order to close this slot 26 when the side window blind is not in use, a flexible cover strip 59 is connected with the reinforcing strip 57 on the front edge of the blind material 31, which in the driven-out state comes to lie against the contour of the reinforcing strip 57. In the driven-in or drawn in state, the cover strip is lifted off sectionwise from the reinforcing strip 57 and lies, closely to the slot 26, on at least one of the slot edges 27.

What is claimed is:

1. A motor vehicle comprising:
    a side window which is bounded by a window embrasure having a first section,
    a hollow space separated from the side window by the first window embrasure section and which is bounded on one side by the first window embrasure section,
    a slot in the first window embrasure section,
    a blind movable through the slot between a drawn-in position wherein the blind is disposed in the hollow space and a drawn-out position wherein the blind overlies at least a portion of the side window, the blind having a shape which at least in one section corresponds at least approximately to the shape of the side window and having a front edge which at least approximately corresponds to an edge of the window which lies opposite the first window embrasure section,
    an actuating mechanism for moving the blind to the drawn-in position, and
    a flexible cover strip fastened to the front edge of the blind and being arranged to at least partially close the slot in the first window embrasure section when the blind is in the drawn-in position.

2. The motor vehicle according to claim 1, wherein the first window embrasure section runs underneath the side window.

3. The motor vehicle according to claim 1, wherein the first window embrasure section extends approximately straight.

4. The motor vehicle according to claim 1, wherein the side window has a pane which is movable through the slot in the first window embrasure section.

5. The motor vehicle according to claim 1, wherein the side window has a pane that is immovable.

6. The motor vehicle according to claim 1, wherein the side window is a side window of a door.

7. The motor vehicle according to claim 1, further including a holding mechanism for holding the cover strip in engagement on the front edge of the blind over the entire length of the blind when the blind is advanced such that the front edge is entirely away from the slot.

8. The motor vehicle according to claim 7, wherein the holding mechanism comprises the cover strip which is resiliently elastic.

9. The motor vehicle according to claim 8, wherein the cover strip in a relaxed state has a curvature that is less than a curvature of the front edge of the blind, and the elasticity of the cover strip automatically holds the cover strip in contact on the front edge.

10. The motor vehicle according to claim 1, wherein the cover strip is secured in a middle area with the front edge.

11. The motor vehicle according to claim 7, wherein the holding mechanism comprises at least one tension member which engages on at least one end of the cover strip and which is formed in such manner that it tends to draw said end of the cover strip toward the front edge.

12. The motor vehicle according to claim 11, wherein the tension member is spring-elastically extensible.

13. The motor vehicle according to claim 1, wherein a tension spring is allocated to the tension member.

14. A motor vehicle according to claim 7, wherein the holding mechanism comprises at least one magnet.

15. The motor vehicle according to claim 1, wherein the cover strip has a length which corresponds to a length of the front edge.

16. The motor vehicle according to claim 1, wherein the cover strip has a length which corresponds to a length of the slot.

17. A motor vehicle according to claim 1, wherein the cover strip is wider than the slot.

18. A motor vehicle according to claim 1, wherein the slot is laterally bounded by an edge that is spaced from the pane and the cover strip protrudes laterally at least over said slot edge with the blind in the drawn-in position.

19. A motor vehicle according to claim 1, wherein the blind comprises a material that can be rolled up with a small radius.

20. A motor vehicle according to claim 1, wherein the actuating mechanism includes a winding-up device which is arranged in the hollow space.

21. A motor vehicle according to claim 20, wherein the wind-up device is a winding shaft to which an edge of the blind is fastened.

22. A motor vehicle according to claim 1, wherein the actuating mechanism includes a spring arrangement by which the blind can be moved in the direction towards the drawn-in position.

23. A motor vehicle according to claim 1, wherein the actuating mechanism includes an electric motor for moving the blind to the drawn-in position.

24. A motor vehicle according to claim 22, wherein the actuating mechanism includes a winding-up device which is arranged in the hollow space and the spring arrangement engages the wind-up device.

25. A motor vehicle according to claim 23, wherein the actuating mechanism includes a winding shaft and the electric motor engages on the winding shaft.

26. A motor vehicle according to claim 1, wherein the actuating mechanism includes a thrust member which engages the front edge of the blind material in order to draw the blind out through the slot.

* * * * *